US 6,632,774 B1

(12) United States Patent
Duffy, Jr.

(10) Patent No.: US 6,632,774 B1
(45) Date of Patent: Oct. 14, 2003

(54) COMPOSITION AND METHOD OF ENHANCING MOISTURE CONTENT OF TREES AND PLANTS

(75) Inventor: Donald V. Duffy, Jr., Temecula, CA (US)

(73) Assignee: Naturally Safe Technologies, Inc., CA (US)

( * ) Notice: Subject to any disclaimer, the term of this patent is extended or adjusted under 35 U.S.C. 154(b) by 0 days.

(21) Appl. No.: 09/569,209

(22) Filed: May 11, 2000

Related U.S. Application Data

(62) Division of application No. 09/388,066, filed on Sep. 1, 1999, now Pat. No. 6,131,331.

(51) Int. Cl.[7] .......................... A01N 3/02; A01N 59/00
(52) U.S. Cl. .................. 504/114; 504/119; 504/125
(58) Field of Search ................................ 504/114, 119, 504/125

(56) References Cited

U.S. PATENT DOCUMENTS

| | | | | |
|---|---|---|---|---|
| 3,678,621 | A | 7/1972 | Reams | 47/58 |
| 4,101,485 | A | 7/1978 | Brooks et al. | 260/29.4 |
| 4,103,457 | A | 8/1978 | Carlisle | 47/58 |
| 4,134,862 | A | 1/1979 | Eden et al. | 260/17.4 |
| 4,145,296 | A | 3/1979 | Fox et al. | 252/8.1 |
| 4,283,219 | A | 8/1981 | Wagner et al. | 71/28 |
| 4,299,613 | A | 11/1981 | Caradarelli | 71/64 |
| 4,342,665 | A | 8/1982 | Itoh et al. | 252/316 |
| 4,381,370 | A | 4/1983 | Aaltonen et al. | 525/54.21 |
| 4,695,488 | A | 9/1987 | Hisamoto et al. | 427/385.5 |
| 4,983,389 | A | 1/1991 | Levy | 424/404 |
| 5,169,687 | A | 12/1992 | Sunol | 427/297 |
| 5,190,110 | A | 3/1993 | von Blucher et al. | 169/46 |
| 5,405,425 | A | 4/1995 | Pieh et al. | 71/27 |
| 5,458,959 | A | 10/1995 | Self et al. | 428/253 |
| 5,629,377 | A | 5/1997 | Burgert et al. | 524/832 |
| 5,733,576 | A | 3/1998 | Chmelir | 424/488 |
| 5,849,210 | A | 12/1998 | Pascente et al. | 252/3 |
| 5,856,370 | A | 1/1999 | Chmelir | 521/128 |
| 5,930,949 | A | 8/1999 | Tsujimoto et al. | 47/57.6 |
| 6,131,331 | A * | 10/2000 | Duffy | 47/58.1 |

* cited by examiner

*Primary Examiner*—Alton Pryor
(74) *Attorney, Agent, or Firm*—William Patrick Waters

(57) ABSTRACT

Composition and method for enhancing the moisture content of growing and cut trees and plants, including the steps of providing a polyacrylimide polymer in crystalline form, mixing salt with the polymer wherein the salt comprises about 5% by weight relative to the polymer, treating the mixture in a reaction tube for about 60 seconds, and applying the mixture to the tree or plant to enhance the ability thereof to absorb and retain moisture.

2 Claims, 1 Drawing Sheet

COMPOSITION AND METHOD OF ENHANCING MOISTURE CONTENT OF TREES AND PLANTS

This application is a divisional application of patent application Ser. No. 09/388,066 filing date Sep. 1, 1999 now U.S. Pat. No. 6,131,331.

BACKGROUND OF THE INVENTION

The present invention relates generally to plant husbandry and, more particularly, to techniques for enhancing the moisture content of trees and plants.

The importance of an adequate water supply for growing and sustaining vascular trees and plants has been long recognized. In numerous cases, improved irrigation methods and soil amendments have proven to have some value in plant husbandry. A need still exists, however, for methods and compositions that are inexpensive to produce and simple to apply that would aid in production of vigorous tree and plant growth. This is especially true of the lumber industry where techniques for increasing growth rates of healthy trees would have substantial economic value. It is true also in agriculture, where improved plant growth rates would be beneficial.

Desirably, such methods and compositions would enable a tree, for example, to take in and retain increased amounts of water.

In many cases, there is a need to preserve trees and plants for a time after they have been cut. As a rule, the tree or plant begins to die after cutting. This is especially true, for example, of Christmas trees that are enjoyed seasonally by millions of people.

In spite of its beauty and association with a traditionally joyous time of year, the Christmas tree often poses a danger because of its propensity to ignite and burn rapidly and vigorously. This propensity increases the older the tree gets after cutting, as the tree loses moisture that is not replaced. One can readily appreciate the danger presented by a dry tree garlanded with hot electrical bulbs and electrical wires capable of igniting the tree as a result of shorting. Since the tree is often displayed in homes and buildings that are heated and generally low in humidity, the fire danger increases over time, as long as the tree is kept.

It has been estimated that each year, in this country alone, hundreds of people are injured or killed in Christmas tree fires and tens of millions of dollars of property damage occur.

Some prior art techniques have been attempted in an effort to reduce the danger of fire. In many cases, the lower portion of the trunk is placed in a tree stand that includes a dish for water. This accomplishes little, in typical conventional systems, to prevent drying of the tree since no mechanism exists for moving the water systemically throughout the vascular system of the tree. As a result, over a relatively short span of time, the tree becomes drier while the risk of combustion increases.

From the foregoing it will be apparent that there is a need for a composition and method that enhance the moisture content of trees and plants thereby to foster growth. In addition, it is desirable that such a composition and method impart a substantial degree of fire resistance to growing trees and to cut trees.

DISCLOSURE OF THE INVENTION

The present invention provides a technique for increasing the capability of growing and cut trees and plants for taking up, and retaining water. In practice, the present invention improves growth rates in trees and plants and renders treated trees substantially fire proof.

In this regard, the present invention comprises a composition and method for enhancing the moisture content of growing and cut trees and plants, including the steps of providing a polyacrylimide polymer in crystalline form, mixing salt with the polymer wherein the salt comprises about 5% by weight relative to the polymer, treating the mixture in a reaction tube for about 60 seconds, and applying the mixture to the tree or plant to enhance the ability thereof to absorb and retain moisture.

The present invention affords several distinct advantages. Firstly, it provides an inexpensive and easily implemented technique for treating growing trees and plants to enhance the ability of the treated tree or plant to take on and retain moisture. The result is a more robust and healthier tree or plant having a substantially increased growth rate. When the technique is utilized for cut trees, such as a Christmas tree, the result is a tree that remains fresh and green for long periods of time and that is fire resistant. In practice, it gas been discovered that the level of fire resistance is so substantial that the tree will not ignite even when an acetylene torch is applied to it.

BRIEF DESCRIPTION OF DRAWINGS

Other aspects and advantages of the present invention will become apparent from the following detailed description, taken in conjunction with the accompanying drawings, illustrating by way of example the principles of the invention.

BEST MODE FOR CARRYING OUT THE INVENTION

Figure 1:
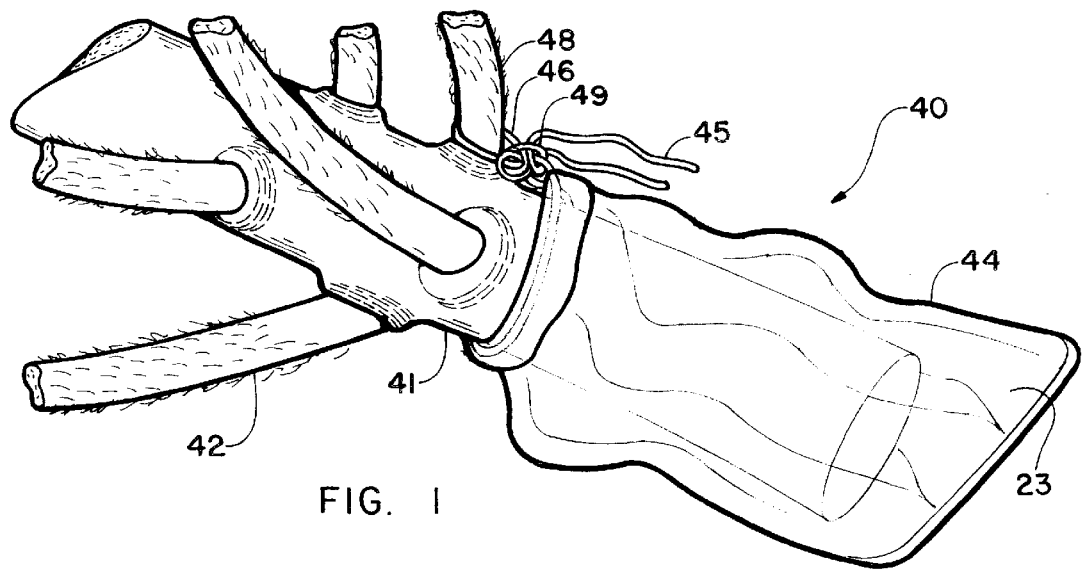
FIG. 1 is a perspective view of a portion of a Christmas tree that is immersed in the composition of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

In the description following, the technique of preparing the composition of the present invention for a single tree, or for a small number of plant seeds, will be discussed. One skilled in the art of tree and plant husbandry will readily understand that the amounts and volumes set forth must be appropriately adjusted when a plurality of trees or plants is to be treated.

In a preferred embodiment of the invention, a crosslinked modified polyacrylamide in crystalline form is mixed with sea salt wherein the salt comprises about 5% by weight relative to the polymer. The polymer of choice is 2-propenoic acid, 2-methyl, 2-hydroxyethyl ester, polymer with methyl 2-propenoate, 2-propenamide and 2-propenoic acid, ammonium sodium salt. The ideal crystal size is about 100μ. The composition is available from JRM Chemical, Inc. 15663 NEO Parkway, Cleveland, Ohio 44128 under the trademark SOIL MOIST™, CAS Number 71042-87-0. Another product, also available from JRM Chemicals, contains a polymer and a fungus and is suitable for the present invention.

After the polymer and salt have been mixed, the mixture is charged in a reaction tube wherein the mixture is placed in a test tube wrapped by an electrically charged 14 gauge single strand wire. Charging continues until the crystals remain on the bottom of the test tube when the tube is inverted. Typically, the time of charging is about 60 seconds although this time may lengthen as environmental humidity increases.

The pH of the vascular fluid of the tree to be treated is now determined. This step is accomplished in a conventional manner by crushing a piece of tree bark in distilled water after which the pH is conventionally determined. In a similar manner, the pH of the polymer mixture is determined and, after determination, muriatic acid or NaOH are utilized to match the polymer mixture pH to that of the tree. Optionally, to increase penetration of the polymer into the tree, a penetrant such as dimethyl sulfoxide (DMSO) may be added at a rate of about 1 oz DMSO to 100 pounds of polymer mixture.

The polymer, salt and penetrant are now slow mixed in a tumbler for about 20 to 30 minutes. Finally, filtered, non-chlorinated drinking water, at a rate of about 2 liters per gram of mixture, is added.

The composition, made by the above described process, is now ready for application. Such application can be to a living, growing tree or to a cut Christmas tree. In order to demonstrate the utility of the present invention, compositions formulated according to the present invention were tested. The examples that follow illustrate certain specific applications of the invention and describe comparative tests wherein conventional techniques were utilized.

EXAMPLE I

An evergreen tree, approximately 7 feet tall, was cut at a tree farm and placed in a bucket containing the solution prepared according to the invention and distilled water. The amount of distilled water was about 2 liters per 5 grams of dry composition. The volume of the liquid in the bucket was measured several times each day with the following results:

| Days 1 and 2 | Tree takes up about 8 ounces of solution with no measurable change. |
| --- | --- |
| Day 3 | No measurable change. |
| Day 4 | Two gallons of water added to the bucket. Tree takes up 118 ounces of liquid. |
| Day 5 | Tree takes up an additional 36 ounces of liquid. |
| Days 6 through 16 | Tree is saturated and stabilized. |

From time to time during the test period, branches were cut from the tree and examined. In each case, after day 4, the vascular system of the branch was fully patent and oozing moisture. Attempts were made to ignite removed branches and, after day 4, the branches would not burn even after being wetted with acetone immediately before an acetylene torch was applied to the branch.

Four months after the tree was treated, it remained fresh and, if watered, its vascular system remained patent and healthy. In addition, after this period of time, the tree remained fire resistant. Further, the tree continued to photosynthesize since growth in height and width were observed.

EXAMPLE II

In a single unfertilized lot, two adjacent and identical 8 feet by 10 feet areas were selected. A cinder block wall, to prevent water leaching between the areas, was buried to a depth of 8 inches in the ground to divide the areas into a "treated" area and an "untreated" area. Both treated and untreated areas were exposed to the identical weather and lighting conditions.

Distilled water was added to the composition of the present invention. The composition was mixed with manure and allowed to dry. In the treated area, 5 holes were made in the ground and about a teaspoon and a half of the dried composition was delivered to each hole. Pumpkin seeds were removed from a seed packet and a seed was placed in each hole and covered with dirt so that the seed was located at a height about 1½ inches above the composition. Five pumpkinseeds were planted in this manner.

Immediately after the treated area was planted, six pumpkinseeds were removed from the packet and planted, one to a hole, in the untreated area. The seeds in this area were planted in potting soil. Both the treated and untreated areas were watered as need and each area received the same amount of water.

After 24 days, the seeds had sprouted and the yields from the two areas were examined. The pumpkin plants in the untreated area had produced no flowers and had leaves on average about 3 inches wide and about 4 inches long. The pumpkin plants in the treated area, by contrast, were in flower and had leaves that, on average, were about 8 inches wide and about 10 inches long.

Figure 2:
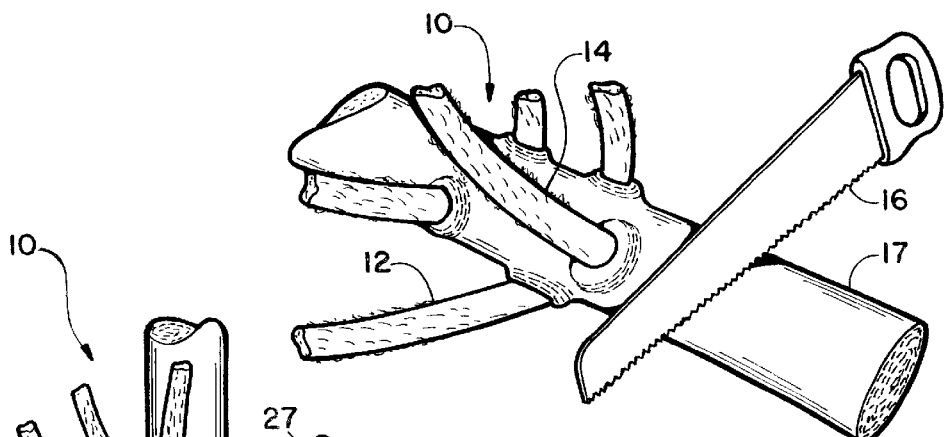
FIG. 2 is a perspective view of a step in preparation of a Christmas tree prior to treatment according to the present invention.
Figure 3:
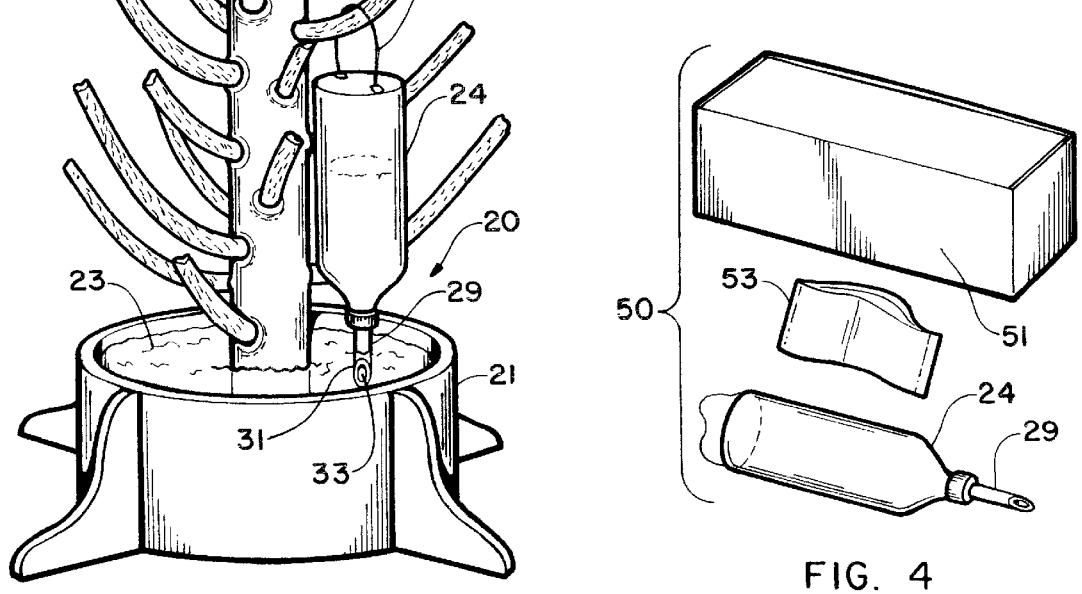
FIG. 3 is a perspective view of a treated Christmas tree shown installed in a tree stand.
Figure 4:
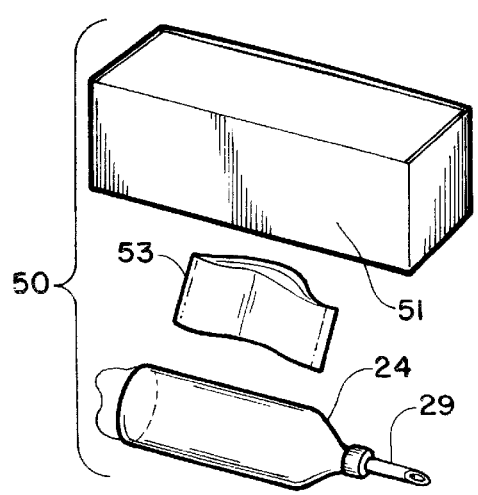
FIG. 4 is an exploded view of a kit constructed according to the present invention for enhancing moisture content of cut trees and plants and for rendering a tree or plant fire resistant.

Reference will now be made to the drawings wherein there is shown, in FIG. 1, a technique of the present invention for preserving a cut tree, and enhancing its moisture content, between the time the tree is cut and the time it is delivered to a customer. FIGS. 2 and 3 show the use of the present invention for preserving the cut tree, and enhancing its moisture content, during the time of use by a customer. FIG. 4 shows, in exploded form, a kit for practicing the technique shown in FIGS. 2 and 3.

With reference now to FIG. 1, there is shown a novel device 40 for preserving a Christmas tree between the time it is cut and the time it is ready for installation in a tree stand. There is shown a tree trunk 41, having branches 42 and 48. A container, preferably a polymer bag 44, containing a liquid mixture of the composition 23 of the present invention, is attached by attaching means, such as a drawstring 45, to the trunk 41. To secure the bag 44 in place, a loop 46 encircles the branch 48 while a knot 49 secures the loop and the drawstring against the trunk 41. Optionally, a small amount of a commercially available nutrient, such as Miracle-Gro™ may be added to the bag 44.

Referring now to the FIGS. 2 and 3 of the drawings, for purposes of illustration, the invention is embodied in a novel technique for enhancing moisture in a cut tree and for rendering a cut tree, such as a conventional fir Christmas tree, fire resistant. As shown in FIG. 2, a cut tree 10 has a portion 17 cut by a saw 16 at a place below branches 12 and 14. The tree 10 is fixed in a bowl 21 that is part of a tree stand 20. A liquid mixture 23 of the composition of the present invention is added to the bowl 21. In addition, a supply bottle 24, containing the mixture 23 is suspended from a branch 27 by a hanger 25. A supply tube 29, in fluid connection with the interior of the bottle 24, includes a tip 31 having an opening 33. Preferably, the tube tip is immersed in the composition 23 to a depth of about ½-inch. As the tree takes up the composition 23 and the level of the composition in the bowl 21 is lowered, additional volumes of composition flow from the bottle 24 into the bowl.

In FIG. 4 there is shown a kit 50 that is suitable for use in practicing the technique shown in FIGS. 2 and 3. The kit comprises a cardboard box 51 that contains the above-described bottle 24, having a supply tube 29. In addition, the kit 50 includes a packet 53 containing the composition of the present invention in crystalline form.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A composition for increasing fire resistance of growing trees and plants by enhancing the moisture content thereof, comprising a polyacrylamide polymer in crystalline form, a penetrant, and a salt wherein said penetrant is dimethyl sulfoxide.

2. The composition according to claim 1, wherein said salt is NaCl.

\* \* \* \* \*